(12) United States Patent  
Maravilla et al.

(10) Patent No.: US 8,504,126 B1  
(45) Date of Patent: Aug. 6, 2013

(54) MOBILE PHONE CASE AND MOBILE PHONE AND CASE COMBINATION

(75) Inventors: Daniel J. Maravilla, Simi Valley, CA (US); Anthony T. Valladares, Thousand Oaks, CA (US)

(73) Assignee: HEX Holdings, LLC, Oxnard, CA (US)

( * ) Notice: Subject to any disclaimer, the term of this patent is extended or adjusted under 35 U.S.C. 154(b) by 0 days.

(21) Appl. No.: 13/396,469

(22) Filed: Feb. 14, 2012

(51) Int. Cl.
*H04B 1/08* (2006.01)
*A45C 11/18* (2006.01)

(52) U.S. Cl.
USPC .......................... 455/575.1; 150/147; 455/347

(58) Field of Classification Search
USPC .... 235/492, 493; 150/147; 206/307; 455/575
See application file for complete search history.

(56) References Cited

U.S. PATENT DOCUMENTS

| | | | |
|---|---|---|---|
| 2008/0169351 A1* | 7/2008 | Whiting | 235/493 |
| 2008/0190526 A1* | 8/2008 | O'Shea | 150/147 |
| 2010/0116702 A1* | 5/2010 | Schentrup et al. | 206/307 |
| 2012/0074233 A1* | 3/2012 | Finn et al. | 235/492 |

* cited by examiner

*Primary Examiner* — Nizar Sivji
(74) *Attorney, Agent, or Firm* — Christie, Parker & Hale, LLP

(57) ABSTRACT

A mobile phone case and a mobile phone case in combination with a mobile phone includes a compartment for receiving a card having magnetic media, and a door covering the compartment. The door is made from a material capable of blocking a magnetic field emitted by a mobile phone to be received in the case.

24 Claims, 4 Drawing Sheets

MOBILE PHONE CASE AND MOBILE PHONE AND CASE COMBINATION

BACKGROUND OF THE INVENTION

Mobile cellular phones emit magnetic fields which may scramble a magnetic carrier, such as the magnetic strip on various cards, as for example credit cards, gift cards, or cards used for gaining access to trains, buses and other transportation. For example, a card used to gain access to public transportation, such as trains, are swiped about a sensor which allows entry through a turn-style or door into the train station. If the magnetic media on such card strip gets scrambled or gets exposed to a magnetic field, the card can no longer achieve its purpose and can not be used for its purpose. Thus, a system is desired to prevent such scrambling of the magnetic media strip on such cards.

SUMMARY

In an exemplary embodiment a mobile phone case is provided. The case includes a compartment for receiving a card, and a door covering the compartment. In an exemplary embodiment, the card includes a magnetic media. The door includes a material capable of blocking a magnetic field emitted by a mobile phone to be received in the case. In another exemplary embodiment, the case includes at least a peripheral wall for surrounding at least a portion of the mobile phone. In yet another exemplary embodiment, the door is received within the compartment. In a further exemplary embodiment, the door frictionally engages a peripheral surface of the compartment. In yet a further exemplary embodiment, the case also includes a depression formed on said case extending to the compartment. In another exemplary embodiment, the door extends over the compartment and surrounding portions of the case surrounding the compartment. In yet another exemplary embodiment, the door is made from ferrite. In a further exemplary embodiment, the door is made from sintered ferrite. In a further exemplary embodiment, the case allows for wireless reading of said magnetic media by an external device. In a further exemplary embodiment, the door is liner. In yet a further exemplary embodiment, the door includes a first portion and a liner over the first portion and it is the liner that includes the material capable of blocking a magnetic field emitted by the mobile phone to be covered by the case. Any of the aforementioned exemplary embodiments may be provided in combination with the mobile phone where the case covers at least a portion of the mobile phone.

DETAILED DESCRIPTION

Figure 1:
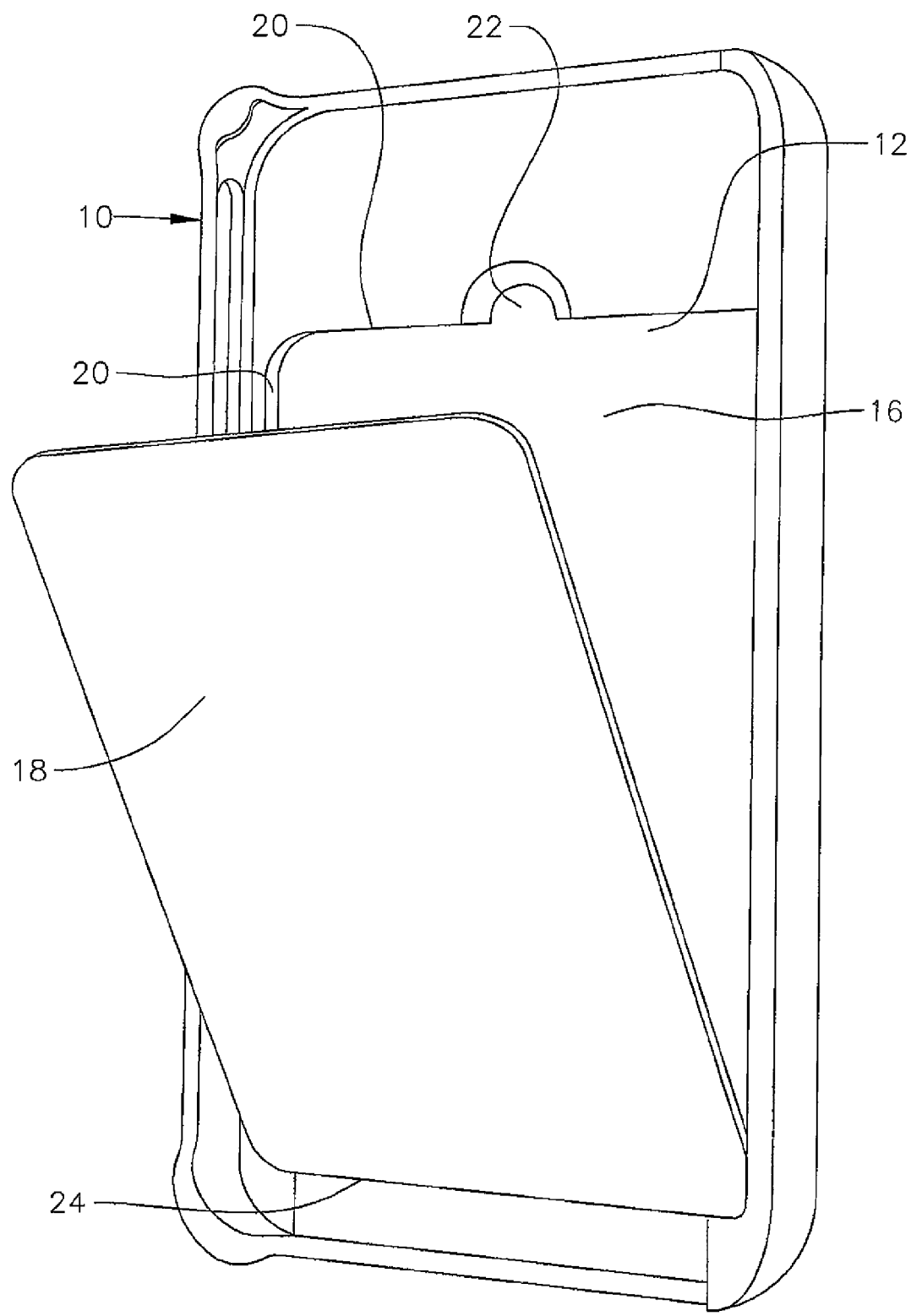
FIG. 1 is a perspective view of an exemplary embodiment mobile phone case of the present invention.
Figure 2:
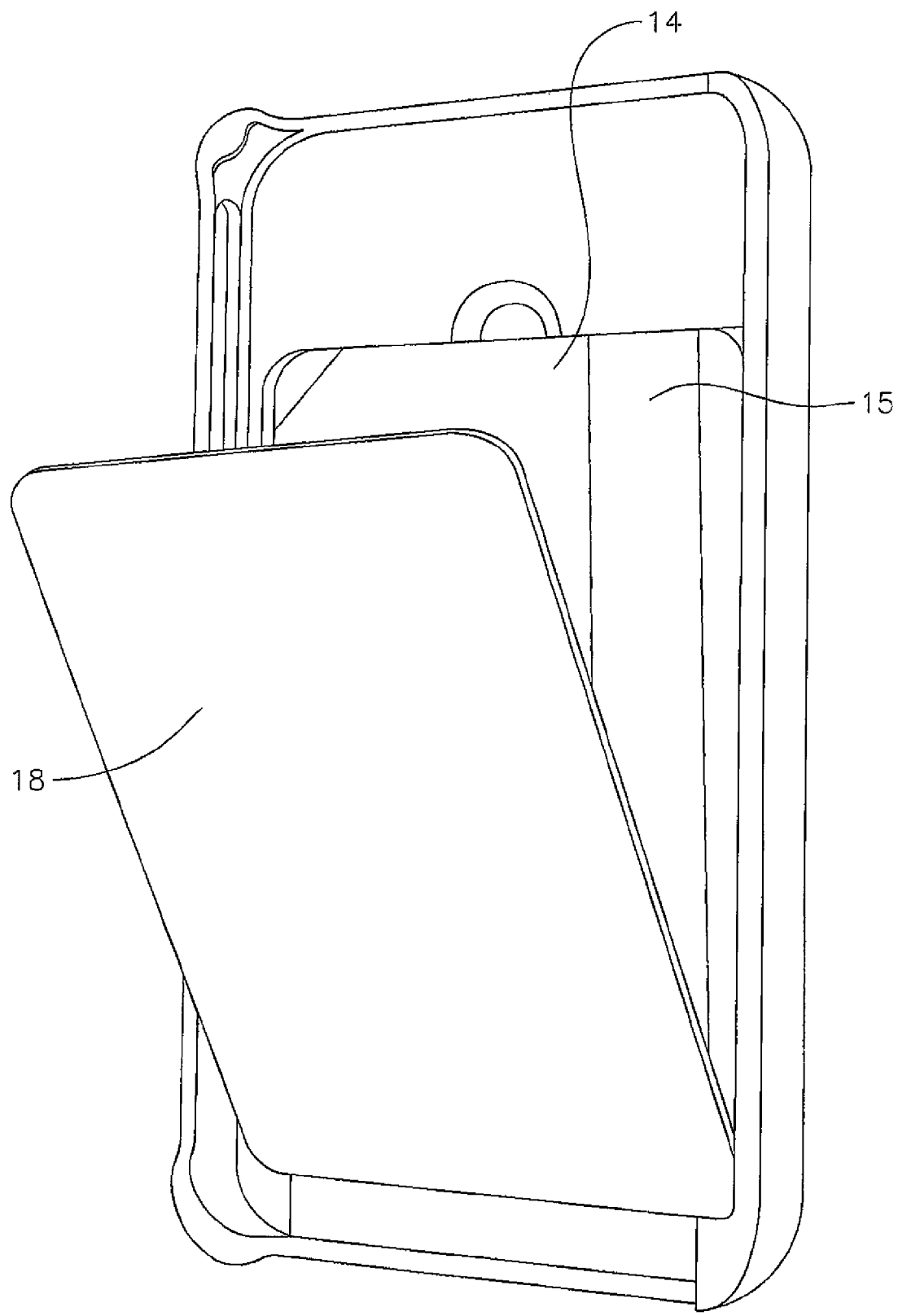
FIG. 2 is a perspective view of the exemplary embodiment mobile phone case shown in FIG. 1 with a card in its compartment.
Figure 3:
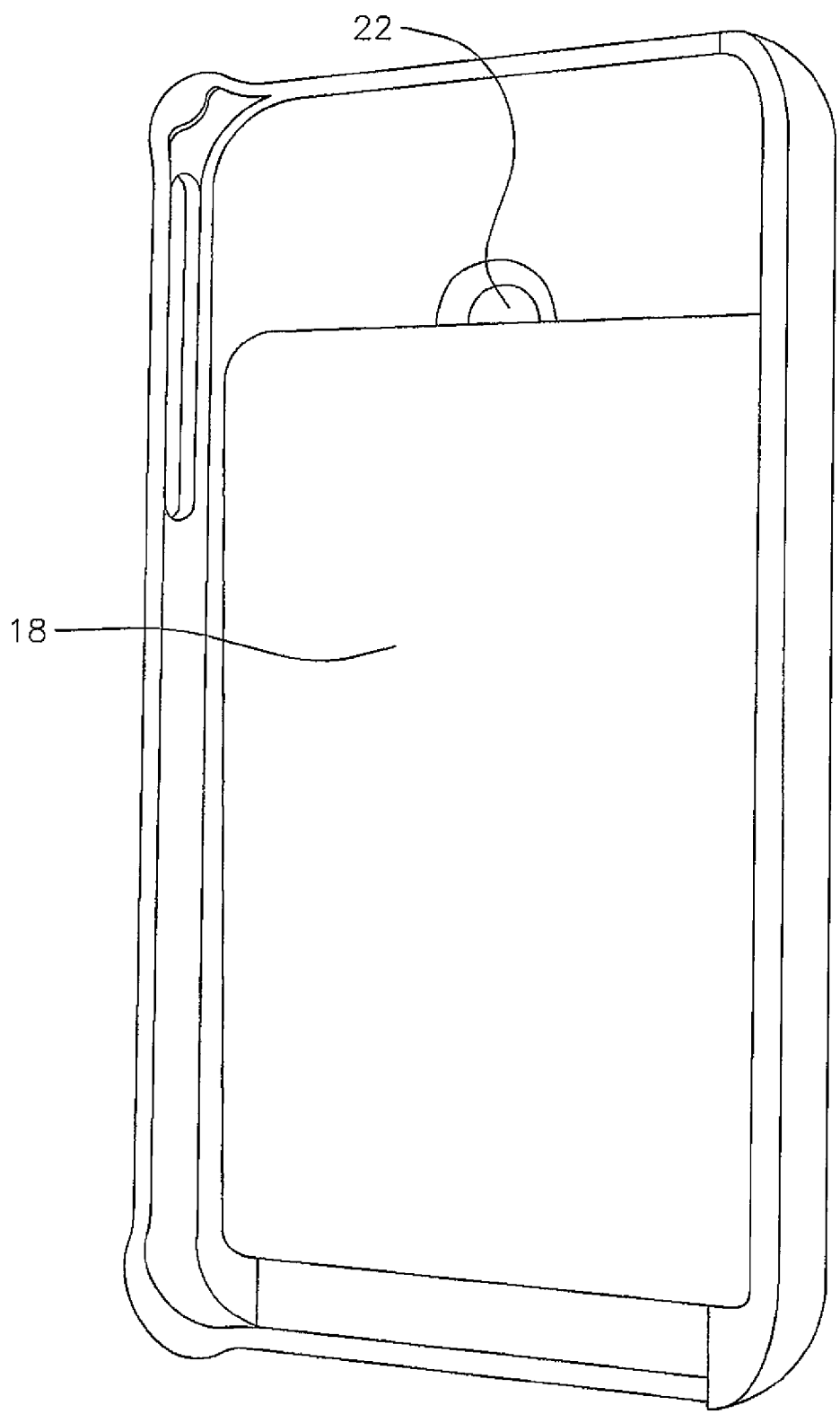
FIG. 3 is a perspective view of the exemplary embodiment mobile phone shown in FIG. 1 with the compartment covered by a door.
Figure 4:
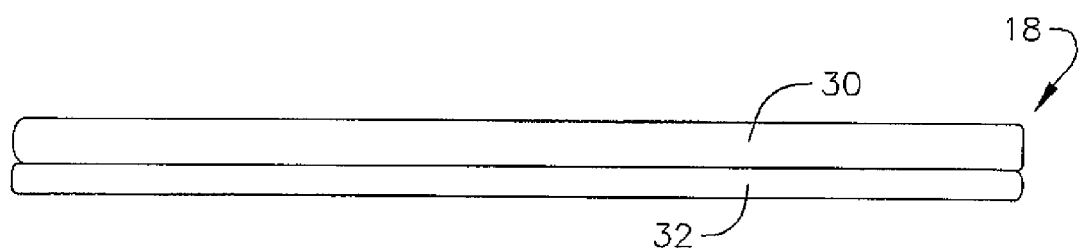
FIG. 4 is a cross-sectional view of an exemplary embodiment door incorporated in an exemplary embodiment mobile phone case of the present invention.

In an exemplary embodiment of the present invention, a cellular phone case 10 is provided that incorporates a compartment 12 for housing a card 14, such as a credit card, a gift card, or a card for use to gain access in transportation, or any other card including a magnetic strip 15 such as a magnetic data strip, as for example shown in FIGS. 1 and 2. In an exemplary embodiment, the compartment includes a wall 16 and the compartment 12 is a depression formed in such wall 16. In an exemplary embodiment, a cover, door or trap door 18 is also coupled to the case wall for covering the compartment and thus any card within the compartment. In an exemplary embodiment, the trap door is made from a material that blocks the magnetic field emitted by the phone. In one exemplary embodiment, the trap door is formed from sintered ferrite. In another exemplary embodiment, the door may be a liner. In yet another exemplary embodiment the door may include a first portion 30 and a second portion 32 covering the first portion (FIG. 4), at least one of which portions 30, 32 is formed from a material that is capable of blocking a magnetic field emitted by the phone. In one exemplary embodiment the portion made from such material is a liner. In yet another exemplary embodiment, the door may be made of various layers, at least one of which is formed from a material that is capable of blocking a magnetic field emitted by the phone. Yet in another exemplary embodiment, the compartment has a depth sufficient to receive the card and also sufficient for receiving the door over the card. In an exemplary embodiment, the dimensions of the compartment are such that the trap door frictionally engages peripheral surfaces 20 of the compartment. A depression 22 (FIGS. 1, 2 and 3) may be formed at an end of the compartment, allowing the user to access an edge of trap door for lifting the trap door so as to expose the compartment and any card within the compartment. In another exemplary embodiment, the trap door may have dimensions such that it overlays the entire compartment and connects with the wall using different means and mechanisms that are well known in the art. In one exemplary embodiment, as for example, the trap door may connect using a Velcro® type of connection. In yet a further exemplary embodiment, the trap door may be pivotally mounted to the case at an edge 24. In another exemplary embodiment, the trap door may be separate from the case.

The mobile phone is placed over the trap door within the case or within the case wall. During use, the magnetic field emitted by the mobile phone will be blocked sufficiently or completely so that it cannot interfere with the card. In an exemplary embodiment, the material of the phone case is such that it does not block wireless non-contact access to card through the case. An exemplary case material is polycarbonate. In this regard, a user may swipe the phone case with the card in its compartment over a sensor designed for interrogating such card (e.g. a sensor for operating a turnstile in a public transportation station) without having to take the card out of the case compartment. In an exemplary embodiment, an external surface of the phone case adjacent the compartment is swiped by the sensor.

Although the present invention has been described and illustrated in respect to exemplary embodiments, it is to be understood that it is not to be so limited, since changes and modifications may be made therein which are within the full intended scope of this invention as hereinafter claimed. For example, the compartment may be used to store other types of cards, even those without any magnetic media.

What is claimed is:

1. A mobile phone case comprising:
   a rear wall;
   a first peripheral wall extending transversely from the rear wall;

a second peripheral wall extending transversely from the rear wall and opposite the first peripheral wall, said first and second peripheral walls and said rear wall defining a receptacle having a channel shape in cross-section having an opening opposite said rear wall for receiving said mobile phone therethrough while providing access to a front surface of said mobile phone while a rear surface of said phone faces said rear wall;

a compartment defined in the rear wall for receiving a card; and a door covering the compartment, said door comprising a material capable of blocking a magnetic field emitted by a mobile phone to be received by said case, wherein the case would allow for wireless reading of a magnetic media of a card received in the compartment by an external device.

2. The case as recited in claim 1, wherein the door is received within the compartment.

3. The case as recited in claim 2, wherein the door frictionally engages a peripheral surface of the compartment.

4. The case as recited in claim 2, further comprising a depression formed on said rear wall extending to the compartment.

5. The case as recited in claim 1, wherein the door extends over the compartment and over at least a portion of the case rear wall surrounding the compartment.

6. The case as recited in claim 1, wherein the door comprises ferrite.

7. The case as recited in claim 6, wherein the door comprises sintered ferrite.

8. The case as recited in claim 1, further comprising a card received in the compartment, wherein the card comprises a magnetic media.

9. The case as recited in claim 1, wherein the door is liner.

10. The case as recited in claim 1, wherein the door comprises a first portion and a liner over said first portion and wherein said liner comprises said material capable of blocking a magnetic field emitted by the mobile phone to be received by said case.

11. A mobile phone case and mobile phone combination comprising:

a mobile phone comprising a front surface, a rear surface, a first peripheral surface and a second peripheral opposite the first peripheral, wherein said first and second peripheral surfaces extend from said front surface to said rear surface; and a case comprising,
a rear wall,
a first peripheral wall extending transversely from the rear wall,
a second peripheral wall extending transversely from the rear wall and opposite the first peripheral wall, said first and second peripheral walls and said rear wall defining a receptacle having a channel shape in cross-section having an opening opposite said rear wall, said mobile phone received in said receptacle through said opening with the rear surface of said mobile phone facing said rear wall, the first peripheral surface of said phone facing said first peripheral wall, and the second peripheral surface of said phone facing said second peripheral wall, a compartment in the rear wall for receiving a card having magnetic media, and a door covering the compartment, said door comprising a material capable of blocking a magnetic field emitted by the mobile phone, wherein the case would allow for wireless reading of a magnetic media of a card received in the compartment by an external device.

12. The combination as recited in claim 11, wherein the door is received within the compartment.

13. The combination as recited in claim 12, wherein the door frictionally engages a peripheral surface of the compartment.

14. The combination as recited in claim 12, further comprising a depression formed on said rear wall extending to the compartment.

15. The combination as recited in claim 11, wherein the door extends over the compartment and over at least a portion of the rear wall surrounding the compartment.

16. The combination as recited in claim 11, wherein the door comprises ferrite.

17. The combination as recited in claim 16, wherein the door comprises sintered ferrite.

18. The combination as recited in claim 11, further comprising a card received in the compartment, wherein the card comprises a magnetic media.

19. The combination as recited in claim 11, wherein the door is liner.

20. The combination as recited in claim 11, wherein the door comprises a first portion and a liner over said first portion and wherein said liner comprises said material capable of blocking a magnetic field emitted by the mobile phone.

21. The case as recited in claim 1, wherein said rear and peripheral walls are formed from a polycarbonate material.

22. The case as recited in claim 1, wherein the door is separate from the case.

23. The combination as recited in claim 11, wherein said case rear and peripheral walls are formed from a polycarbonate material.

24. The combination as recited in claim 11, wherein the door is separate from the case.

* * * * *